Patented Apr. 16, 1935

1,997,735

UNITED STATES PATENT OFFICE 1,997,735

ANTIFREEZE COMPOSITION

Francis L. Lund, Ogden, Utah

No Drawing. Application April 30, 1932,
Serial No. 608,565

1 Claim. (Cl. 252—8)

My invention consists in a new and useful improvement in anti-freeze compositions and is designed to provide a composition to be used in the cooling system of an automobile engine. The particularly novel feature of my invention is the use of aluminum chloride with calcium chloride, in the particular proportions which I have found, by my experience and thorough tests, to secure the beneficial results which I shall hereinafter fully explain. The advantages which my improved composition possesses, over all known compositions for a similar purpose, are its extremely low cost, ease of manufacture, and the fact that it is an aqueous solution which suffers no change of character at a temperature of 45° F. below zero. The salts are non-volatile, show slight re-action to zinc, brass and aluminum, and no specific re-action to heavy metal and rubber. The solution does not wad cotton, and has a boiling point of 217° F. to 218° F. Should the solution reach the boiling point and escape, it has no damaging effect on the finish of the automobile, and produces no poisonous fumes when boiling.

While I have hereinafter fully described one specific embodiment of my invention, it is to be distinctly understood that I do not consider my invention limited to said specific embodiment, but refer for its scope to the claim appended hereto.

The formula for my improved composition is as follows: calcium chloride, $CaCl_2$ (technical flake—76% to 80% pure calcium chloride) two pounds; aluminum chloride, $AlCl_3+6H_2O$, (NF) seven ounces, glycerin (CP) one pint; water as one gallon.

I produce my improved composition by thoroughly dissolving the calcium chloride and the aluminum chloride in the water, and then adding the glycerin. In the modified form of my composition, there is added penetrating oil 2% to the glycerin before the glycerin is added to the solution. In this form, the liquid constituents are in substantially these proportions: Water 85%, glycerin 13%, penetrating oil 2%. The addition of the penetrating oil produces a composition which reduces the accumulation of rust.

It is to be particularly noted that in my studies of anti-freeze solutions my attention was called to suggestive requirements of the U. S. Bureau of Standards advising the non-use of large quantities of calcium chloride. I learned from my personal experiments that in order to cut down the quantity of calcium chloride, as the Bureau of Standards suggests be done, I had to replace a part of this salt with a salt similar in reaction, but less caustic and which would take less in amounts to keep the water from freezing at extremely low points. I learned that aluminum chloride is the only salt that can stand up in the tests and keep in solution at all temperatures. I found through my experiments that aluminum chloride in combination with calcium chloride would give the desired degrees below zero, and that my solution has all of the advantages of other solutions for the same purpose. This feature of my composition is very important in that I have been able to cut down the calcium chloride quantity 50%, and have found that my solution is far less caustic than the heavy solution of calcium chloride. With aluminum chloride 1 ounce and calcium chloride 1 pound, there is protection down to 10° to 12° F. below zero, which is insufficient protection. By increasing the aluminum chloride to 1¾ ounces and decreasing the calcium chloride to 8 ounces, the protection remains the same, i. e. at about 12° F. below zero. However, by increasing the aluminum chloride four time, i. e. to 7 ounces, and likewise the calcium chloride, i. e. to 32 ounces or 2 pounds, the protection is brought down to from 45° F. to 48° F. below zero, which is sufficient.

The fact that both calcium chloride and aluminum chloride are non-volatile is an important factor, in that careless drivers often "boil their cars", and fail to check up on the water. With the addition of 1 pint of CP glycerin to 7 pints of mixture, my solution will not crystallize, but becomes syrupy whenever 86% of aqueous solution is boiled away. This is entitled to much emphasis, because crystallization in the radiator is expensive to remove. I feel that there should be emphasized also the driving range protection afforded by my composition. At from 180° to 210° F. or higher, my solution will not precipitate, filter, or crystallize. After boiling it becomes metallic in nature, and not caustic. There is complete safety, at either high or low temperatures. The driver always has full, maximum protection, as he needs only to add water, and even with cold water added to hot solution there is no precipitation.

Having described my invention, what I claim is:

A cooling medium having a freezing point below —45° F. and a boiling point above 217° F. consisting of a solution formed by adding two pounds of calcium chloride and seven ounces of aluminum chloride to glycerin, one pint, and water as one gallon.

FRANCIS L. LUND.

CERTIFICATE OF CORRECTION.

Patent No. 1,997,735. April 16, 1935.

FRANCIS L. LUND.

It is hereby certified that error appears in the printed specification of the above numbered patent requiring correction as follows: Page 1, first column, line 35, and second column, line 54, the claim, for "as" read qs; and that the said Letters Patent should be read with these corrections therein that the same may conform to the record of the case in the Patent Office.

Signed and sealed this 8th day of October, A. D. 1935.

Leslie Frazer
Acting Commissioner of Patents.

(Seal)